US012648582B2

(12) United States Patent
Imaizumi et al.

(10) Patent No.: US 12,648,582 B2
(45) Date of Patent: Jun. 9, 2026

(54) NON-ALCOHOLIC BEER TASTE BEVERAGE PACKED IN CONTAINER

(71) Applicant: SUNTORY HOLDINGS LIMITED, Osaka (JP)

(72) Inventors: Keisuke Imaizumi, Tokyo (JP); Yuichi Kato, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 47 days.

(21) Appl. No.: 16/480,424

(22) PCT Filed: Jan. 25, 2018

(86) PCT No.: PCT/JP2018/002197
§ 371 (c)(1),
(2) Date: Jul. 24, 2019

(87) PCT Pub. No.: WO2018/143038
PCT Pub. Date: Aug. 9, 2018

(65) Prior Publication Data
US 2019/0380361 A1      Dec. 19, 2019

(30) Foreign Application Priority Data

Jan. 31, 2017     (JP) ................................. 2017-015447

(51) Int. Cl.
| | |
|---|---|
| *A23L 2/38* | (2021.01) |
| *A23B 70/10* | (2025.01) |
| *A23L 2/56* | (2006.01) |
| *C12C 12/04* | (2006.01) |

(52) U.S. Cl.
CPC .............. *A23L 2/382* (2013.01); *A23B 70/10* (2025.01); *A23L 2/56* (2013.01); *C12C 12/04* (2013.01); *A23V 2002/00* (2013.01)

(58) Field of Classification Search
CPC ... A23L 2/56; A23L 2/382; A23L 2/44; A23L 2/38; A23L 2/60; C12C 12/04; A23V 2002/00; A23V 2000/00
USPC ........................................................ 426/590
See application file for complete search history.

(56) References Cited

U.S. PATENT DOCUMENTS

| | | | |
|---|---|---|---|
| 4,916,851 A | 4/1990 | Pedersen | |
| 7,302,974 B2 * | 12/2007 | Oono ...................... | C12C 5/026 141/100 |
| 2007/0212460 A1 | 9/2007 | Noue et al. | |
| 2008/0108710 A1 | 5/2008 | Prakash et al. | |
| 2009/0285965 A1 | 11/2009 | Liu | |
| 2011/0217431 A1 * | 9/2011 | Ido ........................... | A23L 2/54 426/131 |
| 2012/0121734 A1 | 5/2012 | Inoue et al. | |
| 2014/0220179 A1 * | 8/2014 | Matsui ...................... | A23L 2/56 426/11 |
| 2014/0220222 A1 * | 8/2014 | Murakami ................ | A23L 2/38 426/598 |
| 2014/0308425 A1 | 10/2014 | Teranishi et al. | |
| 2014/0342077 A1 * | 11/2014 | Teranishi .................. | A23L 2/60 426/590 |
| 2016/0075980 A1 | 3/2016 | Maruhashi et al. | |

FOREIGN PATENT DOCUMENTS

| | | |
|---|---|---|
| CN | 104120054 A | 10/2014 |
| JP | 2-20231 A | 1/1990 |
| JP | 2009-532042 A | 9/2009 |
| JP | 2011-072228 A | 4/2011 |
| JP | 2011-217706 A | 11/2011 |
| JP | 2012-244971 A | 12/2012 |
| JP | 5249197 B2 | 7/2013 |
| JP | 2014-011973 A | 1/2014 |
| JP | 2014-128240 A | 7/2014 |
| JP | 2014-166169 A | 9/2014 |
| JP | 2014-180269 A | 9/2014 |
| JP | 2015-027309 A | 2/2015 |
| JP | 2015-107073 A | 6/2015 |
| JP | 2015-107107 A | 6/2015 |
| JP | 2015-133924 A | 7/2015 |
| JP | 2015-164428 A | 9/2015 |
| JP | 2015-198597 A | 11/2015 |
| JP | 2016-049047 A | 4/2016 |
| JP | 2016-111964 A | 6/2016 |
| KR | 10-2007-0114736 A | 12/2007 |
| WO | 00/24273 A1 | 5/2000 |
| WO | 2014/192357 A1 | 12/2014 |

(Continued)

OTHER PUBLICATIONS

Masao K et al. (English translation of JP 2012-244971 A ). (Year: 2012).*
NPL Glucose sweetness (Retrieved on May 31, 2022). (Year: 2022).*
International Search Report dated May 1, 2018, issued in counterpart Application No. PCT/JP2018/002197 (13 pages).
Third Party Observation dated May 21, 2019, filed in counterpart JP Application No. PCT/JP2018/002197, with English translation (18 pages).
Carbonated Malt Beverage, http://www.gnpd.com (5 pages); Cited in Third Party Observation dated May 21, 2019.
Alcohol Free Mixed Drink, http://www.gnpd.com, with partial English translation (7 pages); Cited in Third Party Observation dated May 21, 2019.

(Continued)

*Primary Examiner* — Erik Kashnikow
*Assistant Examiner* — Bhaskar Mukhopadhyay
(74) *Attorney, Agent, or Firm* — WHDA, LLP

(57) ABSTRACT

The present invention provides a non-alcoholic beer taste beverage packed in a container in which an astringent flavor produced due to the addition of a preservative is masked. According to one aspect of the present invention, there is provided a non-alcoholic beer taste beverage packed in a container, the beverage including a preservative, a sweet-flavor substance, and a bitter-flavor substance, and the value of sweetness/bitterness as a ratio of the sweetness represented in mass ppm in terms of sucrose and the bitterness (BU) being 100-1200.

7 Claims, No Drawings

(56) References Cited

FOREIGN PATENT DOCUMENTS

WO        2015/132974 A1        9/2015

OTHER PUBLICATIONS

Barroso, Jose Manuel, Regulations, Official Journal of the European Union, Commission Regulation (EU) No. 1129/2011, Nov. 11, 2011 (8 pages); Cited in Third Party Observation dated May 21, 2019.
"Standards for Use and Storage of Food Additives", Japan Food Chemical Research Foundation, 2017, Partial English translation (24 pages); Cited in Third Party Observation dated May 21, 2019.
Ash, Irene et al., "Handbook of Preservatives", 2004 (6 pages); Cited in Third Party Observation dated May 21, 2019.
"No Detection of Alcohol Content and Standard Value of Artificial Sweetener", Life in the North Area Kiramekku, Hokkaido Consumer Affairs Center, No. 83, Jan. 1, 2014, with partial English translation (10 pages); Cited in Third Party Observation dated May 21, 2019.
Von Delbruck, Max et al., "Jahrbuch 1998 der Versuchs- und Lehranstalt für Brauerei in Berlin (VLB)", VLB Berlin—Forschungsinstitute und Abteilungen, with English translation (5 pages); Cited in Third Party Observation dated May 21, 2019.
EU Approved additives and E Numbers|Food Standards Agency Mar. 1, 2018 (28 pages); Cited in Third Party Observation dated May 21, 2019.
Hakuo Yanagisawa, Document to Ask about whether Neotame Is Designated as a Food Additive with partial translation; Cited in Third Party Observation dated May 21, 2019.
Submission of Information dated Jan. 8, 2020, issued in counterpart JP application No. 2018-565482, with English translation. (10 pages).

Criteria for Use and Storage of Additives (recited up to the revision on Sep. 26, 2016 (Heisei 28)), with partial translation, cited in JP Submission of Information dated Feb. 28, 2020. (21 pages).
Submission of Information dated Feb. 28, 2020, issued in counterpart JP application No. 2018-565482, with English translation. (12 pages).
Office Action dated Jan. 7, 2020, issued in counterpart JP application No. 2018-565482, with English translation. (9 pages).
Office Action dated Apr. 28, 2020, issued in counterpart JP application No. 2018-565482, with English translation. (9 pages).
Office Action dated Mar. 9, 2022, issued in counterpart to CN Application No. 201880008335.4, with English machine translation. (13 pages).
Office Action dated Feb. 6, 2023, issued in counterpart KR application No. 10-2019-7023814, with English translation. (11 pages).
Office Action dated Apr. 20, 2023, issued in counterpart CN application No. 201880008335.4, with English translation. (13 pages).
Biendl, M. & Pinzl, C. "Hops and Health". Brewers Association of the Americas, Technical Quarterly. 2009, vol. 46, pp. 1-7; AU Office Action dated Aug. 16, 2023. (1 page).
Schonberger, CH & Kostelecky, T. "125th anniversary review: The role of hops in brewing." Journal of the Institute of Brewing. 2011, vol. 117, pp. 259-267; AU Office Action dated Aug. 16, 2023. (9 pages).
Schurr, B.C. et al., "Molecular mechanisms behind the antimicrobial activity of hop iso-α-acids in Lactobacillus brevis." Food Microbiology. 2015, vol. 46, pp. 553-563; AU Office Action dated Aug. 16, 2023. (3 pages).
Office Action dated Aug. 16, 2023, issued in counterpart to Au Application No. 2018214361. (4 pages).

* cited by examiner

NON-ALCOHOLIC BEER TASTE BEVERAGE PACKED IN CONTAINER

TECHNICAL FIELD

The present invention relates to a non-alcoholic beer-taste beverage packed in a container.

BACKGROUND ART

The consumer needs for beer-taste beverages such as beer are becoming more diverse. Due to this, methods for supplying beer-taste beverages are also becoming more diverse.

In general, beer-taste beverages have been conventionally supplied in the form of sealed cans or bottles containing them, but in recent years, they are distributed in a state of being packed in containers such as barrels and supplied using a dispenser or the like in some cases. When the beer-taste beverages are supplied through such a route, they are provided in a state where the container is connected to the dispenser for a fixed period of time after the container is unsealed, differently from usual cans or bottles. In such a case, risks of deterioration, etc. due to microbial growth or the like increase, and therefore, it is necessary to add preservatives such as sodium benzoate to inhibit microbial growth. Accordingly, beer-taste beverages containing preservatives have been studied (e.g., Patent Document 1).

However, the preservatives for food sometimes have peculiar taste, so that attempts to improve such taste by combining the preservatives with other raw materials have been made (e.g., Patent Document 2).

PRIOR ART DOCUMENT

Patent Document

Patent Document 1: Japanese Patent No. 5249197
Patent Document 2: Japanese Patent Publication No. H02-20231

SUMMARY OF INVENTION

Problem to be Solved by the Invention

As the preservatives for use in beer-taste beverages, benzoic acids having the effect of enhancing preservability of products and inhibiting microbial growth are often used, and the benzoic acids are generally added in the form of benzoates. Of benzoates, sodium benzoate that is a sodium salt is often used, but preservatives such as benzoic acids have astringency and exert negative influence on the flavor, and hence, when they are used for beer-taste beverages, they can be added in only small amounts, leaving a possibility that satisfactory preservability cannot be obtained. Accordingly, beer-taste beverages astringency of which caused by adding preservatives has been masked and which are suitable for being packed in containers are desired.

Means for Solving the Problem

The present invention has been made in order to solve such a problem, and as a result of earnest studies by the present inventors, they have acquired knowledge that the astringency can be suppressed to a certain extent by adding a sweet substance. On the other hand, for suppressing astringency only by adding a sweet substance, a large amount of a sweet substance needs to be introduced, and it is difficult to adjust the sweetness to moderate one while suppressing astringency. In this regard, the present inventors have further earnestly studied, and as a result, they have acquired knowledge that by adding a bitter substance to a certain amount of a sweet substance in a prescribed ratio, the sweetness can be adjusted to moderate one while astringency is suppressed. In usual, when only a bitter substance is added, astringency and bitterness are mixed, thereby deteriorating aftertaste, and therefore, it is an unexpected result that the astringency can be improved by adding a sweet substance and a bitter substance in a prescribed ratio as in the present invention. The present invention is on the basis of the above knowledge.

The present invention includes inventions of the following aspects.

[1] A non-alcoholic beer-taste beverage packed in a container, comprising a preservative, a sweet substance and a bitter substance, wherein
the beverage has a sweetness/bitterness ratio of 100 to 1200, and the sweetness/bitterness ratio is a ratio of a degree of sweetness expressed in ppm by mass in terms of sucrose to a bitterness unit (BU).

[2] The non-alcoholic beer-taste beverage packed in a container according to [1], wherein a content of the sweet substance is 1000 to 20000 ppm by mass in terms of sucrose.

[3] The non-alcoholic beer-taste beverage packed in a container according to [1] or [2], wherein the bitterness is 10 to 50 BUs.

[4] The non-alcoholic beer-taste beverage packed in a container according to any of [1] to [3], wherein the sweet substance is at least one selected from the group consisting of glucose, maltose, acesulfame K and sucralose.

[5] The non-alcoholic beer-taste beverage packed in a container according to any of [1] to [4], wherein the preservative is at least one selected from the group consisting of benzoic acid, a benzoate and a benzoic ester.

[6] The non-alcoholic beer-taste beverage packed in a container according to any of [1] to [5], wherein a content of the preservative is 10 to 1000 ppm by mass.

[7] The non-alcoholic beer-taste beverage packed in a container according to [5], wherein a content of the preservative is 10 to 1000 ppm by mass in terms of benzoic acid.

[8] The non-alcoholic beer-taste beverage packed in a container according to any of [1] to [7], wherein the bitter substance is a hop-derived component.

[9] The non-alcoholic beer-taste beverage packed in a container according to [8], wherein the hop-derived component contains an iso-$\alpha$ acid.

Effect of the Invention

According to one aspect of the present invention, a non-alcoholic beer-taste beverage packed in a container, astringency of which caused by adding a preservative has been masked, can be provided.

Modes for Carrying Out the Invention

1 Non-Alcoholic Beer-Taste Beverage Packed in Container
The non-alcoholic beer-taste beverage packed in a container of the present invention is a beverage comprising a preservative, a sweet substance and a bitter substance, wherein the beverage has a sweetness/bitterness ratio (or

[degree of sweetness]/[bitterness unit]) of 100 to 1200, and the sweetness/bitterness ratio is a ratio of the degree of sweetness expressed in ppm by mass in terms of sucrose to a bitterness unit (BU).

In the present specification, the "non-alcoholic beer-taste beverage" refers to a non-alcoholic carbonated beverage having beer-like flavor. That is to say, unless otherwise noted, the non-alcoholic beer-taste beverages in the present specification include any non-alcoholic carbonated beverages having beer flavor regardless of the presence or absence of a step of fermentation due to yeast. Examples of types of the non-alcoholic beer-taste beverages of the present invention also include non-alcoholic beer-taste beverages (beer-taste beverages having an alcohol content of less than 0.05 v/v %) and beer-taste refreshing beverages.

The alcohol content in the non-alcoholic beer-taste beverage packed in a container of the present invention is preferably less than 0.05 v/v %, and more preferably 0.00 v/v %. In the present specification, the alcohol content is expressed in percentage based on volume/volume (v/v %). The alcohol content in the beverage can be measured by any method publicly known, and for example, it can be measured by an oscillating type densitometer.

The non-alcoholic beer-taste beverage packed in a container of the present invention is particularly suitable for an aspect packed in a container. Although examples of the containers include a bottle, a can and a barrel, the non-alcoholic beer-taste beverage of the present invention is suitable particularly for use in a barrel. As the container of the non-alcoholic beer-taste beverage packed in a container of the present invention, a recappable container can also be preferably used, and such a container is, for example, a bottle, a metal bottle or a plastic bottle with a screw cap. When the non-alcoholic beer-taste beverage is distributed in a state of being packed in a container such as a barrel and supplied using a dispenser or the like, the beverage is provided for a fixed period of time in a state where the container is connected to the dispenser after the container is unsealed. Also when the non-alcoholic beer-taste beverage is distributed in a state of being packed in a recappable container, a consumer once uncaps the container, then caps the container and preserves the beverage for a fixed period of time in some cases. In such cases, risks of deterioration, etc. due to microbial growth or the like increase, and therefore, it is necessary to add preservatives such as sodium benzoate to inhibit microbial growth. Here, benzoic acids have astringency and have a fear of exerting negative influence on the flavor, but in the non-alcoholic beer-taste beverage of the present invention, such astringency can be effectively masked, and hence, microbial growth can be inhibited while negative influence on the flavor is suppressed. From this, the non-alcoholic beer-taste beverage packed in a container of the present invention is particularly suitable for an aspect packed in a container.

In the non-alcoholic beer-taste beverage packed in a container of the present invention, sweetness/bitterness ratio is a ratio of the degree of sweetness expressed in ppm by mass in terms of sucrose to a bitterness unit (BU), and the value of the sweetness/bitterness ratio is 100 to 1200. When the value of sweetness/bitterness ratio is in this range, the astringency caused by adding a preservative is effectively masked. The value of sweetness/bitterness ratio is preferably 100 to 1000, and more preferably 150 to 800.

In the present invention, the "degree of sweetness" is a value obtained by converting sweetness of a product into sweetness of sucrose. The degrees of sweetness of various sweet substances in terms of sucrose can be investigated from publicly known literatures (Murakami, et al., "AMAI TOU TO AMAKUNAI TOU (in Japanese, sweet sugar and non-sweet sugar)", Journal of the Society for Biotechnology, Japan, Public Interest Incorporated Association the Society for Biotechnology, Japan, 2011, Vol. 89, No. 8, pp. 486-490; Japan Sugar Refiners' Association, "KANMIRYO NO SORAN" (in Japanese, comprehensive list of sweeteners), etc). For example, when the degree of sweetness of sucrose is defined as 1, degrees of sweetness of general sweet substances are as in the following table. However, the sweet substances employable for the non-alcoholic beer-taste beverage packed in a container of the present invention are not limited to those in the following table, and a person skilled in the art can use sweet substances other than those described in the following table, from the description of the above publicly known literatures, etc.

TABLE 1

|  | Degree of sweetness |
| --- | --- |
| Sucrose | 1 |
| Glucose | 0.75 |
| Maltose | 0.3 |
| Acesulfame K | 200 |
| Sucralose | 600 |

In the present specification, the "bitterness unit" is an index of bitterness brought about by iso-$\alpha$ acids such as isohumulone. The bitterness units can be measured in accordance with a method described in the section of "the BCOJ Beer Analysis Method (2004, 11.1 Revised Edition), 8.15 Bitterness Units". For example, an acid is added to a degassed sample, thereafter extraction with isooctane is carried out, then an absorbance of the resulting isooctane layer is measured at 275 nm using isooctane as a control, and the resulting value is multiplied by a factor, whereby a bitterness unit (BU) can be obtained, but the measurement of the bitterness unit is not limited to this method. The bitterness unit is not particularly limited as long as the value of sweetness/bitterness ratio satisfies 100 to 1200, and the bitterness is preferably 10 to 50 BUs, and more preferably 15 to 30 BUs.

The preservative, the sweet substance and the bitter substance contained in the non-alcoholic beer-taste beverage packed in a container of the present invention are described in detail in "1.1 Raw materials".

1.1 Raw Materials

As the raw materials of the non-alcoholic beer-taste beverage of the present invention, a preservative, a sweet substance and a bitter substance are used. In addition, water, grains, water-soluble dietary fibers, various additives, etc., which are used as raw materials of general non-alcoholic beer-taste beverages, may also be used.

Although the preservative is not particularly limited, it is preferably at least one preservative selected from the group consisting of benzoic acid, a benzoate and a benzoic ester. Examples of the benzoate include sodium benzoate, and examples of the benzoic ester include propyl paraoxybenzoate and butyl paraoxybenzoate. Moreover, Strong SAN-PRESER (manufactured by San-Ei Gen F.F.I., Inc., mixture of sodium benzoate and butyl benzoate) is also frequently used as commercial formulation.

The content of the preservative is preferably, but not limited to, 10 to 1000 ppm by mass, and more preferably 100 to 700 ppm by mass. When a preservative of any of benzoic acids is used as the preservative, the content of the preservative is preferably 10 to 1000 ppm by mass, and more preferably 60 to 600 ppm by mass, in terms of benzoic acid. The content in terms of benzoic acid can be calculated from the content of the preservative of any of benzoic acids. For example, when sodium benzoate (molecular weight: 144.11 g/mol) is used as the preservative, the content in terms of benzoic acid (molecular weight: 122.12 g/mol) can be calculated from the following formula.

Content in terms of benzoic acid (ppm by mass)=
content of sodium benzoate (ppm by mass)×
[(molecular weight of benzoic acid (g/mol))/
(molecular weight of sodium benzoate (g/mol))]

Examples of the sweet substances include, but not limited to, saccharides and other sweeteners. Examples of the saccharides include commercial saccharification liquids obtained by decomposing starch derived from grains by an acid, an enzyme or the like, and commercial starch syrups. The saccharides may be in any forms, for example, liquids such as solution and solids such as powder. There is no specific limitation also on the types of raw material grains of starch, the method for refining starch, and the conditions of treatment such as hydrolysis with an enzyme or an acid. For example, saccharides that have been increased in a ratio of maltose by thinking out the conditions of hydrolysis with an enzyme or an acid may be used. In addition, maltose, sucrose, fructose, glucose, maltulose, trehalose, torehalulose, maltotriose, and solutions thereof (saccharide solutions) can be used. In addition to the above saccharides, sugar alcohols, such as erythritol, xylitol and mannitol, synthetic sweeteners, such as acesulfame K, sucralose, aspartame and neotame, and natural sweeteners, such as stevia extract, licorice extract and Luo Han Guo (Siraitia grosvenorii) extract, can be used as the sweet substances. As the sweet substance, one sweet substance selected from the above sweet substances may be used, or a plurality of sweet substances may be used in combination. Preferably, the sweet substance is at least one selected from the group consisting of glucose, maltose, acesulfame K and sucralose.

The content of the sweet substance is not particularly limited as long as the value of sweetness/bitterness ratio satisfies 100 to 1200, and the content thereof is preferably 1000 to 20000 ppm by mass, and more preferably 2000 to 10000 ppm by mass, in terms of sucrose. By specifying the content of the sweet substance to this range, the sweetness of the non-alcoholic beer-taste beverage can be suppressed, and the comprehensive evaluation of taste of the non-alcoholic beer-taste beverage becomes better.

The bitter substance is not particularly limited, and a bittering agent used as a raw material of usual beer or low-malt beer can be used. Examples of the bittering agents include a hop-derived component, Quassin, naringin, citrus extract, Picrasma wood extract, coffee extract, tea extract, bitter melon extract, lotus embryo extract, Aloe arborescens extract, Artemisia absinthium extract, rosemary extract, Ganoderma lucidum extract, laurel extract, sage extract, caraway extract, isohumulones and reduced isohumulones. Preferably, a hop-derived component is contained as the bitter substance. The hops refer to usual pellet hops used for producing beer or the like, bale hops, hop extracts, hop processed products (isolated hop, hexa hop, tetra hop), or the like. As the hop-derived component, at least one of an iso-α acid and an α acid is preferably contained, and an iso-α acid is more preferably contained.

The content of the bitter substance is not particularly limited as long as the value of sweetness/bitterness ratio satisfies 100 to 1200, and the content thereof is such an amount that the bitterness is preferably 10 to 50 BUs, and more preferably 15 to 30 BUs.

Examples of the grains include wheat/barley varieties (barley, wheat, rye, adlay, Avena fatua, oats, Avena sativa, malts of these grains, etc.), rice (polished rice, brown rice, etc.), corn, kaoliang, potato, bean (soybean, pea, etc.), buckwheat, sorghum, chestnut, barnyard millet, starch obtained from these grains, and extracts of these grains.

The malts refer to those obtained by germinating seeds of wheat/barley varieties such as barley, wheat, rye, adlay, Avena fatua, oats and Avena sativa, and subjecting the germinated seeds to drying and grubbing, and any production areas or any cultivars are available. In the present invention, barley malt is preferably used. The barley malt is one of malts most commonly used as raw materials of non-alcoholic beer-taste beverages in Japan. Examples of the barleys include two-row barley and six-row barley, and any of them may be used. Not only usual malts but also colored malts can also be used. When colored malts are used, colored malts of different types may be used in appropriate combination, or one colored malt may be used.

In addition, water-soluble dietary fibers, such as indigestible dextrin, polydextrose, guar gum decomposition product, pectin, glucomannan, alginic acid, laminarin, fucoidin and carrageenan, can also be used. Of these, indigestible dextrin and polydextrose are preferable from the viewpoints of versatility such as stability and safety.

1.2 Carbon Dioxide Gas

As the carbon dioxide gas contained in the non-alcoholic beer-taste beverage packed in a container of the present invention, carbon dioxide gas contained in a raw material may be utilized, or carbon dioxide gas may be dissolved in the beverage by mixing carbonated water or by adding carbon dioxide gas.

When a fermented liquid is used as a raw material, carbon dioxide gas is generated in the fermentation step, and therefore, this carbon dioxide gas can be used as it is, as the carbon dioxide gas contained in the non-alcoholic beer-taste beverage packed in a container of the present invention. When a non-fermented liquid is used as a raw material, carbon dioxide gas generated in the fermentation step cannot be utilized, and therefore, by mixing the non-fermented liquid and carbonated water or by adding carbon dioxide gas to the non-fermented liquid, carbon dioxide gas can be dissolved in the non-alcoholic beer-taste beverage packed in a container.

The amount of the carbon dioxide gas contained in the non-alcoholic beer-taste beverage packed in a container of the present invention is represented by a carbon dioxide gas pressure in the beverage, and this is not particularly limited as long as the effect of the present invention is not hindered. Typically, the upper limit of the carbon dioxide gas pressure in the beverage is 4.0 kg/cm$^2$, 3.4 kg/cm$^2$ or 2.8 kg/cm$^2$, the lower limit thereof is 0.2 kg/cm$^2$, 0.9 kg/cm$^2$ or 1.5 kg/cm$^2$, and any combination of these upper limits and lower limits may be used. For example, the carbon dioxide gas pressure of the beverage may be 0.2 kg/cm$^2$ or more and 4.0 kg/cm$^2$ or less, 0.2 kg/cm$^2$ or more and 3.4 kg/cm$^2$ or less, 0.9 kg/cm$^2$ or more and 2.8 kg/cm$^2$ or less, or 1.5 kg/cm$^2$ or more and 2.8 kg/cm$^2$ or less. In the present specification, the gas pressure refers to a gas pressure in the container except in special cases. Measurement of the pressure can be carried out by a method well known to a person skilled in the art, such as a method including fixing a sample set at 20° C. to a gas internal pressure meter, then opening a stopcock of the gas internal pressure meter once to degas the sample, closing the stopcock again, shaking the gas internal pressure meter, and reading the value when the needle reaches a fixed position, or the measurement can be carried out by using a commercial gas pressure measuring device.

1.3 Other Additives

In the present invention, various additives may be added, when needed, as long as the effect of the present invention is not hindered. For example, a colorant, a foaming agent, a flavoring agent, a fermentation accelerator, a yeast extract, a protein-based substance such as peptide-containing substance, a seasoning agent such as amino acid, an antioxidant such as ascorbic acid, and various acidulants may be added, when needed, as long as the effect of the present invention is not hindered. The colorant is used to impart beer-like color to the beverage, and a caramel pigment or the like can be used. The foaming agent is used to form beer-like foam in the beverage or to maintain foam of the beverage, and plant-extracted saponin-based substances such as soybean saponin and Quillaja saponin, protein-based substances such as plant proteins, e.g., corn and soybean, peptide-containing substances and bovine serum albumin, yeast extracts, etc. can be appropriately used. The flavoring agent is used to impart beer-like flavor, and a flavoring agent having beer flavor can be used in an adequate amount. The fermentation accelerator is used to accelerate fermentation due to yeast, and for example, yeast extracts, bran components such as rice and wheat/barley, vitamins and mineral agents can be used singly or in combination.

1.4 Beverage Packed in Container

The non-alcoholic beer-taste beverage packed in a container of the present invention is a beverage packed in a container. For the beverage packed in a container, a container of any form or any material may be used, and examples of the containers include a bottle, a can, a barrel and a plastic bottle, and of these, a barrel is preferable. A recappable container can also be preferably used as the container, and such a container is, for example, a bottle, a metal bottle or a plastic bottle with a screw cap.

2 Method for Producing Non-Alcoholic Beer-Taste Beverage Packed in Container

A method for producing the non-alcoholic beer-taste beverage and a method for packing the beverage in a container are described below as the steps of production of the non-alcoholic alcoholic beer-taste beverage packed in a container.

2.1 Method for Producing Non-Alcoholic Beer-Taste Beverage

The method for producing the non-alcoholic beer-taste beverage is described below in two different cases where fermentation is carried out and where fermentation is not carried out.

(1) Production Steps in Case of Carrying Out Fermentation

The non-alcoholic beer-taste beverage used in the method for producing the non-alcoholic beer-taste beverage packed in a container of the present invention is obtained through beer-taste beverage production steps well known to a person skilled in the art, such as preparation step, fermentation step, maturation step and filtration step.

Specifically, raw materials are introduced into a preparation pot or a preparation tank, then an enzyme such as amylase is added when needed, and the raw materials are subjected to gelatinization and saccharification and then subjected to filtration and boiling, followed by removing solid components such as coagulated protein in a clarification tank. Thereafter, yeast is further added to perform fermentation, then yeast is removed by a filtering machine or the like, and water and additives such as a flavoring agent, an acidulant and a colorant are added when needed, thereby obtaining a non-alcoholic beer-taste beverage. The preservative, the sweet substance, the bitter substance, the flavoring agent, the acidulant, the colorant, etc. may be added in prescribed amounts after the fermentation step, or they may be added at any timing in the production steps including gelatinization/saccharification step, and the timing of addition is not limited. For example, a natural sweetener such as starch syrup may be added in the gelatinization/saccharification step, and the bitter substance may be added in the boiling step.

The fermentation step only needs to be a step of adding yeast to an undiluted liquid containing wheat/barley, malt, a malt extract, soybean peptide, water, etc. to perform fermentation, and the various conditions such as fermentation temperature and fermentation period of time can be freely determined. For the undiluted liquid, not only is wort used but also nutrient sources necessary for the fermentation may be supplied as other grains (soybean, corn, pea, etc.), amino acid, peptide, a saccharification liquid, and the like. When a non-alcoholic beer-taste fermented beverage is produced, fermentation may be carried out under the conditions of 8 to 25° C. and 5 to 10 days, which are fermentation conditions for producing usual beer and low-malt beer. The fermentation period of time is up to 14 days. In the course of the fermentation step, the temperature (temperature rise or temperature drop) of the fermented liquid or the pressure may be changed.

The yeast for use in the fermentation step can be selected taking into consideration the type of the fermented beverage to be produced, the desired flavor, the fermentation conditions, etc. For example, commercial yeast such as a strain of Weihenstephan-34 can be used. As the yeast, a yeast suspension may be added as it is to the wort, or a slurry of concentrated yeast obtained by centrifugation or precipitation may be added to the wort. Yeast obtained by completely removing a supernatant liquid after the centrifugation may be added. The amount of the yeast added to the wort can be appropriately determined, and is, for example, about $5\times10^6$ cells/ml to $1\times10^8$ cells/ml.

(2) Production Steps in Case of Carrying Out No Fermentation

The steps of production of the non-alcoholic beer-taste beverage used in the method for producing the non-alcoholic beer-taste beverage packed in a container of the present invention do not include a fermentation step, and the non-alcoholic beer-taste beverage is obtained by a mixing step wherein an undiluted liquid containing wheat/barley, malt, a malt extract, soybean peptide, water, etc. is mixed with carbonated water or carbon dioxide gas. In this step, additives such as a flavoring agent, an acidulant and a colorant may be added. For the undiluted liquid, not only is wort used but also nutrient sources necessary for the fermentation may be supplied as other grains (soybean, corn, pea, etc.), amino acid, peptide, a saccharification liquid, and the like. The steps to obtain a non-fermented liquid may include, in addition to the mixing step, non-alcoholic beer-taste beverage production steps well known to a person skilled in the art, such as a preparation step, a saccharification step and a maturation step. The preservative, the sweet substance, the bitter substance, the flavoring agent, the acidulant, the colorant, etc. may be added in prescribed amounts in the mixing step, or they may be added in any step other than the mixing step, and the timing of addition is not limited.

2.2 Method for Packing Non-Alcoholic Beer-Taste Beverage in Container

The method for packing the non-alcoholic beer-taste beverage packed in a container of the present invention is not particularly limited, and a container packing method well known to a person skilled in the art can be used. Through the container packing step, the non-alcoholic beer-taste beverage packed in a container of the present invention can be packed and sealed in a container. In the container packing step, a container of any shape and any material may be used, and examples of the containers include those described in "1.4 Beverage packed in container".

The present invention is more specifically described with reference to the following examples, but the present invention is in no way limited to those examples.

EXAMPLES

[Example A] Examination of Effects in the Case of Preparation of Non-Alcoholic Beer-Taste Beverages Having Various Combinations of Degrees of Sweetness and Bitterness Units and Containing 300 ppm of Sodium Benzoate (Preparation of Sample)

A non-alcoholic beer-taste beverage was prepared in the following manner.

Into a preparation tank, preparation water and malt were introduced in such a manner that a weight ratio between malt and the preparation water became malt:preparation water=1:6, thereby preparing a mash at about 50° C. The mash was kept at the temperature for 40 minutes, then gradually heated, and kept for about 60 minutes in a temperature range of 65° C. to 72° C., thereby saccharifying the mash. The mash after completion of saccharification was heated up to 76° C. to deactivate the enzyme, then transferred into a wort lauter tun and lautered, thereby obtaining a wort. To the resulting filtrate, hot water was added to dilute the filtrate, and raw materials were added in such a manner that the amounts of hops and a caramel pigment became 1 g and 0.4 g, respectively, based on 1 L of the diluted wort, followed by boiling the resulting wort at 100° C. for 80 minutes using a boiling kettle. After the boiling was completed, the wort was transferred into a whirlpool tank, then a wort sediment was removed, and the resulting wort was cooled to about 2° C.

The extract content in the resulting cooled liquid was adjusted, and a sweet substance (acesulfame K), a bitter substance (hop extract (iso-α acid)) and a preservative (sodium benzoate) were added in such a manner that the compositions of Example 1 to Example 6 and Comparative Example 1 to Comparative Example 4 became those shown in Table 2.

Moreover, a flavoring agent and carbon dioxide gas were added in appropriate concentrations so that the non-alcoholic beer-taste beverage might have necessary flavor, and an appropriate amount of lactic acid was added so that the final product might have pH 3.5 to 4.0.

Thereafter, sterilization operation was carried out under the conditions of 65° C. and not shorter than 10 minutes, thereby obtaining Example 1 to Example 6 and Comparative Examples 1 to 4. The alcohol contents of Example 1 to Example 6 and Comparative Examples 1 to 4 were each 0.00 v/v %.

(Evaluation of Flavor)

In the present specification, the flavor of the non-alcoholic beer-taste beverage was evaluated by a sensory test due to a scoring method. Well-trained five sensory evaluators carried out five-grade evaluation on the "masking effect" on astringency and the "comprehensive evaluation" of the non-alcoholic beer-taste beverage, and in the case of "astringency masking effect", five grades were: the masking effect is "exceedingly observed=3 points", "definitely observed=2.5 points", "observed=2 points", "hardly observed=1.5 points", and "not observed at all=1 point", and in the case of "comprehensive evaluation" of the non-alcoholic beer-taste beverage, five grades were: "very good=3 points", "good=2.5 points", "somewhat good=2 points", "ordinary=1.5 points", and "not good=1 point".

In each item, an average score was calculated, and according to the resulting each average score, the masking effect and the comprehensive evaluation of Examples and Comparative Examples were evaluated based on four grades shown in Table 2.

TABLE 2

| Masking effect | | Comprehensive evaluation | |
| --- | --- | --- | --- |
| Less than 1.5 | not observed | Less than 1.5 | not good |
| 1.5 - less than 2 | observed but small | 1.5 - less than 2 | not so good |
| 2 - less than 2.5 | observed | 2 - less than 2.5 | good |
| 2.5-3 | greatly observed | 2.5-3 | very good |

In each of the masking effect and the comprehensive evaluation, a beverage having an average score of less than 1.5 points was regarded as fail.

The evaluation results of Examples and Comparative Examples are set forth in Table 3.

TABLE 3

(Example A)

| Examination of sweetness-bitterness balance | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| --- | --- | --- | --- | --- | --- | --- | --- | --- | --- | --- |
| Sodium benzoate (ppm) | 300 | 300 | 300 | 300 | 300 | 300 | 300 | 300 | 300 | 300 |
| In terms of benzoic acid (ppm) | 254 | 254 | 254 | 254 | 254 | 254 | 254 | 254 | 254 | 254 |
| Sweetness (ppm in terms of sucrose) | 3000 | 5000 | 5000 | 8000 | 20000 | 20000 | 5000 | 100 | 3000 | 20000 |
| Bitterness units (BUs) | 10 | 20 | 50 | 10 | 20 | 50 | 3 | 25 | 50 | 10 |
| Sweetness/bitterness ratio | 300 | 250 | 100 | 800 | 1000 | 400 | 1667 | 4 | 60 | 2000 |
| Alcohol content (v/v %) | 0.00 | 0.00 | 0.00 | 0.00 | 0.00 | 0.00 | 0.00 | 0.00 | 0.00 | 0.00 |
| Masking effect | 2.2 | 2.6 | 2.3 | 2.8 | 2.8 | 2.8 | 1.4 | 1.1 | 1.3 | 1.9 |
| Comprehensive evaluation | 2.5 | 2.8 | 2.5 | 2.7 | 2.2 | 2.3 | 1.4 | 1.3 | 1.1 | 1.3 |

As described in Table 3, in Examples in which a balance between sweetness and bitterness had been adjusted, a masking effect preferable to that of Comparative Examples was observed, and the evaluation of the non-alcoholic beer-taste beverage was also good.

[Example B] Examination of Effect Due to Difference in Preservative Concentration The concentration of the preservative was examined.

Preparation of samples and evaluation thereof were carried out in the same manner as in Example A, except that the amount of sodium benzoate added was changed to 50 ppm or 700 ppm. Likewise, preparation of a sample containing no preservative as Reference Example 1 and evaluation thereof were also carried out. The results are set forth in Table 4.

TABLE 4

|  | (Example B) | | | | | | |
| --- | --- | --- | --- | --- | --- | --- | --- |
| Examination of sodium benzoate concentration | Ex. 7 | Ex. 8 | Ex. 9 | Ex. 10 | Ex. 11 | Ex. 12 | Ref. Ex. 1 |
| Sodium benzoate (ppm) | 50 | 50 | 50 | 700 | 700 | 700 | 0 |
| In terms of benzoic acid (ppm) | 42 | 42 | 42 | 593 | 593 | 593 | 0 |
| Sweetness (ppm in terms of sucrose) | 5000 | 5000 | 20000 | 5000 | 5000 | 20000 | 5000 |
| Bitterness units (BUs) | 20 | 50 | 20 | 20 | 50 | 20 | 20 |
| Sweetness/bitterness ratio | 250 | 100 | 1000 | 250 | 100 | 1000 | 250 |
| Alcohol content (v/v %) | 0.00 | 0.00 | 0.00 | 0.00 | 0.00 | 0.00 | 0.00 |
| Masking effect | 2.6 | 2.2 | 2.9 | 2.7 | 2.4 | 2.9 | — |
| Comprehensive evaluation | 2.7 | 2.2 | 2.4 | 2.6 | 2.1 | 2.1 | 2.7 |

As described in Table 4, in Examples in which a balance between sweetness and bitterness had been adjusted, a preferred masking effect was observed even though the preservative concentrations were different, and the evaluation of the non-alcoholic beer-taste beverage was also good. Moreover, the evaluation of the non-alcoholic beer-taste beverages of Examples was comparable to that of Reference Example to which a preservative causing astringency had not been added.

[Example C] Examination of Effect Due to Difference in Type of Preservative

The type of the preservative was examined.

Preparation of samples and evaluation thereof were carried out in the same manner as in Example A, except that benzoic acid, propyl paraoxybenzoate, butyl paraoxybenzoate, and Strong SANPRESER (manufactured by San-Ei Gen F.F.I., Inc., mixture of sodium benzoate and butyl benzoate, weight ratio between sodium benzoate and butyl benzoate=5:1) were used as the preservatives. The results are set forth in Table 5.

TABLE 5

|  | (Example C) | | | |
| --- | --- | --- | --- | --- |
|  | Examination of preservative | | | |
|  | Ex. 13 | Ex. 14 | Ex. 15 | Ex. 16 |
| Preservative | benzoic acid | propyl paraoxy- benzoate | butyl paraoxy- benzoate | Strong SANPRESER (Na salt + butyl ester) |
| Sweetness (in terms of sucrose) (ppm) | 5000 | 5000 | 5000 | 5000 |

TABLE 5-continued

|  | (Example C) | | | |
| --- | --- | --- | --- | --- |
|  | Examination of preservative | | | |
|  | Ex. 13 | Ex. 14 | Ex. 15 | Ex. 16 |
| Preservative | benzoic acid | propyl paraoxy- benzoate | butyl paraoxy- benzoate | Strong SANPRESER (Na salt + butyl ester) |
| Bitterness units (BUs) | 20 | 20 | 20 | 20 |
| Sweetness/bitterness ratio | 250 | 250 | 250 | 250 |
| Preservative concentration (ppm) | 250 | 100 | 100 | 360 (total) |
| In terms of benzoic acid (ppm) | 250 | 67.8 | 62.9 | 292.0 |
| Alcohol content (v/v %) | 0.00 | 0.00 | 0.00 | 0.00 |
| Masking effect | 2.7 | 2.6 | 2.5 | 2.5 |
| Comprehensive evaluation | 2.8 | 2.6 | 2.4 | 2.8 |

As described in Table 5, in Examples in which a balance between sweetness and bitterness had been adjusted, a preferred masking effect was observed even though the types of the preservatives were different, and the evaluation of the non-alcoholic beer-taste beverage was also good.

[Example D] Examination of Effect Due to Difference in Type of Sweet Substance

The type of the sweet substance was examined.

Preparation of samples and evaluation thereof were carried out in the same manner as in Example A, except that glucose, maltose, sucralose, and a mixture of acesulfame K and sucralose (3:1 by weight) were used as the sweet substances. The results are set forth in Table 6.

TABLE 6

| | (Example D) | | | |
| --- | --- | --- | --- | --- |
| | Type of sweet substance | | | |
| | Ex. 17 | Ex. 18 | Ex. 19 | Ex. 20 acesulfame |
| Sweet substance | glucose | maltose | sucralose | K + sucralose |
| Sweetness (in terms of sucrose) (ppm) | 5000 | 5000 | 5000 | 5000 |
| Bitterness units (BUs) | 20 | 20 | 20 | 20 |
| Sweetness/bitterness ratio | 250 | 250 | 250 | 250 |
| Sodium benzoate (ppm) | 300 | 300 | 300 | 300 |
| In terms of benzoic acid (ppm) | 254 | 254 | 254 | 254 |
| Alcohol content (v/v %) | 0.00 | 0.00 | 0.00 | 0.00 |
| Masking effect | 2.5 | 2.3 | 2.3 | 2.3 |
| Comprehensive evaluation | 2.5 | 2.5 | 2.3 | 2.3 |

As described in Table 6, in Examples in which a balance between sweetness and bitterness had been adjusted, a preferred masking effect was observed even though the types of the sweet substances were different, and the evaluation of the non-alcoholic beer-taste beverage was also good.

The invention claimed is:

1. A non-alcoholic beer-taste non-fermented beverage packed in a container, comprising a preservative, a sweet substance and a bitter substance, wherein the bitterness is 10 to 50 Bus, the beverage has a sweetness/bitterness ratio of 100 to 800, and the sweetness/bitterness ratio is a ratio of a degree of sweetness expressed in ppm by mass in terms of sucrose to a bitterness unit (BU), and wherein a content of the preservative is 10 to 1000 ppm by mass, and wherein the sweet substance is at least one selected from the group consisting of glucose, maltose, acesulfame K and sucralose.

2. The non-alcoholic beer-taste non-fermented beverage packed in a container according to claim 1, wherein a content of the sweet substance is 1000 to 20000 ppm by mass in terms of sucrose.

3. The non-alcoholic beer-taste non-fermented beverage packed in a container according to claim 1, wherein a content of the preservative is 60 to 600 ppm by mass in terms of benzoic acid.

4. The non-alcoholic beer-taste non-fermented beverage packed in a container according to claim 1, wherein the bitter substance is a hop-derived component.

5. The non-alcoholic beer-taste non-fermented beverage packed in a container according to claim 4, wherein the hop-derived component contains an iso-$\alpha$ acid.

6. The non-alcoholic beer-taste non-fermented beverage packed in a container according to claim 1, wherein the beverage has a sweetness/bitterness ratio of 150 to 800.

7. The non-alcoholic beer-taste non-fermented beverage packed in a container according to claim 1, wherein the preservative is at least one selected from the group consisting of benzoic acid, a benzoate and a benzoic ester.

* * * * *